(12) United States Patent
Pizzo et al.

(10) Patent No.: US 7,849,109 B1
(45) Date of Patent: Dec. 7, 2010

(54) USE OF SERVER PROCESSING OF TEMPORARY RESULTS FOR STATELESS PAGING OVER ARBITRARY USER QUERIES

(75) Inventors: Michael J. Pizzo, Bellevue, WA (US); Lale R. Divringi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 10/909,093

(22) Filed: Jul. 30, 2004

(51) Int. Cl.
*G06F 17/30* (2006.01)
(52) U.S. Cl. ..................................... 707/809
(58) Field of Classification Search .................. 707/1, 707/4, 10, 100
See application file for complete search history.

(56) References Cited

U.S. PATENT DOCUMENTS

| | | | |
|---|---|---|---|
| 6,460,027 B1 * | 10/2002 | Cochrane et al. | 707/2 |
| 6,460,071 B1 * | 10/2002 | Hoffman | 709/203 |
| 6,539,396 B1 * | 3/2003 | Bowman-Amuah | 707/103 R |
| 6,640,244 B1 * | 10/2003 | Bowman-Amuah | 709/207 |
| 6,748,448 B1 * | 6/2004 | Barrera et al. | 709/245 |
| 2002/0111949 A1 * | 8/2002 | Barga et al. | 707/10 |
| 2002/0143728 A1 * | 10/2002 | Cotner et al. | 707/1 |
| 2005/0021505 A1 * | 1/2005 | Bernal et al. | 707/3 |
| 2005/0021514 A1 * | 1/2005 | Barga et al. | 707/3 |
| 2005/0228823 A1 * | 10/2005 | Cotner et al. | 707/103 R |

OTHER PUBLICATIONS

Freeze, Wayne S., "Data Paging," Sep. 1, 2003, http://devcenter.infragistics.com/Articles/PrintArticle.aspx?ArticleID=1230, pp. 1-7.*
Meier, J.D., et al., "Chapter 4: Architecture and Design Review of a .NET Application for Performance and Scalability," May 2004,Microsoft, pp. 1-26.*
Freeze, Wayne, "Data Paging," Sep. 1, 2003, ASP.NETPro, pp. 1-5.*
Agrawal R. et al., "Reducing Page Thrashing in Recursive Query Processing", Foundations of Data Organization and Algorithms. 4th International Conference, *FODO*, 1993, 247-263.
Bouganim, L. et al., "Memory-Adaptive Scheduling for Large Query Execution", *Proceedings of the 1998 ACM CIKM International Conference on Information and Knowledge Management*, 1998, 105-115.

(Continued)

*Primary Examiner*—Neveen Abel Jalil
*Assistant Examiner*—Farhan M Syed
(74) *Attorney, Agent, or Firm*—Woodcock Washburn LLP (57) ABSTRACT

A query processor's capabilities may be employed to identify a range rows resulting from a user query to be returned. A server cursor may be declared, opened, fetched from and closed in a single batched request in order to avoid keeping state on a database server between requests. A single block fetch may be used within the batch to retrieve a requisite number of rows from a specified ordinal position. Where server cursors are not available, an intermediate table may be used to hold a subset of the rows resulting from the user query, and row numbers may be added to facilitate selecting the range of rows from that intermediate table. Intelligence within a query processor may be leveraged to support identifying the range of rows to be returned without maintaining state between client requests.

20 Claims, 7 Drawing Sheets

OTHER PUBLICATIONS

Feuerstein, E. et al., "Paging more than One Page", *Journal of Graph Algorithms and Applications*, 1998, 2, 273-285.

Feuerstein, E. et al., "Memory Paging for Connectivity and Path Problems in Graphs", *Journal of Graph Algorithms and Applications*, 1998, 2(6), 1-22, http://www.cs.brown.edu/publications/jgaa.

Rose, C. et al., "Paging Cost Minimization Under Delay Constraints", *IEEE INFOCOM*, The Conference on Computer Communications, 14th Annual Joint Conference of the IEEE Computer and Communication Societies, 1995, 2, 490-495.

* cited by examiner

PRIOR ART

USE OF SERVER PROCESSING OF TEMPORARY RESULTS FOR STATELESS PAGING OVER ARBITRARY USER QUERIES

FIELD OF THE INVENTION

The invention relates to paging data and in particular to the transient use of server cursors or temporary tables for stateless paging over arbitrary user queries.

BACKGROUND OF THE INVENTION

OLTP (on-line transaction processing) refers to software that facilitates and manages transaction-oriented applications. OLTP is commonly used for data entry and retrieval transactions in a number of industries, including banking, airlines, mail-order, supermarkets, and manufacturers. OLTP today typically includes programs that allow real-time inputting, recording, and retrieval of data to and from a networked system. The speed of recording the data and the reaction time of the system is critical.

Historically, OLTP employs relational databases which maintain the state of the OLTP world. Previously, it was common for all the database interactions to be performed in batch mode at the direction of a database administrator who typically set up reports to be run, or operations to execute and so on within the context of the database. The data from the OLTP database was typically read out in a forward-only manner. A manager who wanted a report on sales in region three typically would request the report from the MIS (Management Information Systems) department and would have to wait some period of time until the report was produced.

As time passed, interactions with the OLTP data became more interactive. These early interactive interactions were typically small and quick transactional interactions. For example, an OLTP database might hold bank account information, which could be queried by a bank teller. The bank teller could often request a customer's banking activity over a period of time and would typically receive a stream of results, in a read only fashion. In time there was the ability, when positioned on one of those results, to modify the row positioned on. Such an operation is called a cursored operation, the term cursor referring to the current focus (e.g., a particular row) in a set of results. Hence, the bank teller now was able to update or delete records by positioning within the set results.

In addition to cursored operations are searched operations, enabling modification of records based on selected criteria. Searched operations require the record to be operated on to be uniquely identified. Typically this is done via a primary key. For example, if a deposit to account number 034 made on June 3 is to be deleted, the deposit may be assigned a transaction identifier, say 76342. To delete the deposit record, a request may be sent to the database system to delete transaction number 76342. Thus, searched operations are frequently more performant and scalable because positioning on a row and locking the row is avoided.

Cursored operations were originally designed to be run within the process of the database or if in an external process, at least programmatically, and thus are typically very fast because a program rather than a user is performing the operation. Because the processing was done programmatically, data was typically returned as a highly optimized forward-only stream of results. Operations such as viewing a previous record or moving to an arbitrary position in the result were not supported.

Problems with scalability emerge when users directly access the data because users are slow in comparison to the speed at which computers process data. For example, suppose a program retrieves certain specified activities, processes through those activities, and periodically updates, deletes or inserts a row. While a program could perform these tasks efficiently and minimize the contention for resources, a user performs tasks much less efficiently and the database is required to keep state for the user. Keeping state limits the number of people able to access the database at the same time because the database has to track usage and lock and unlock records as records are used and released.

Today, individuals want direct access to the data in real time. The Internet has been a driving force in this change in user expectations. For example, a user expects to be able to bid on an item at an auction site in real-time at the same time that other users are accessing that data. Now, however, the number of users sharing access to the data is enormous. When multiple people try to change or access the same records, contention results. Contention is a major factor limiting scalability.

Even in read-only scenarios, having to track state such as connection, sort order, aggregate and grouping values, temporary results, cursor position, etc., as each user navigates through a set of query results severely limits the ability of the database to scale to the number of concurrent users supported by common enterprise, let alone Internet, applications.

Pushing per-user state down to the client application typically improves scalability of the system by reducing the per-user state being maintained by the database. However, with an ever increasing sea of data, the number of results matching any particular query can be extremely large, and retrieving all of those results to keep state on the client can be expensive in terms of latency, network bandwidth, database and server resources, and client memory.

A common alternative to retrieving all of the results from a potentially large query is to return a range of results, for example the first 10 records, followed by the next 10, and so on. This is referred to as paging. However, paging is typically difficult to implement, particularly over ad-hoc user queries and stored queries or procedures.

In the absence of an easy-to-use paging mechanism, applications often query more data than needed and simply ignore results in excess of a single current page. Even when the results in excess of a single current page are ignored, the results may still be materialized and transmitted to a client, resulting in response delays and wasted resources.

It would be helpful if there were a way to easily request a range of rows from within a result set without holding state between requests.

SUMMARY OF THE INVENTION

Server side processing of temporary results is employed to identity a range of rows from within a result to be returned.

A query processor's cursoring capabilities may be employed to identify rows to be returned. The cursor may be declared using the query from a client, opened, fetched from and closed in a single batched request in order to avoid keeping state on a database server between requests. A single block fetch may be used within the batch to retrieve a requisite number of rows from a specified ordinal position. Intelligence within a query processor may be leveraged to support server cursors without maintaining state between client requests.

Where server cursors are not supported, the client query may be used to select results into a temporary table, further processing performed on the server to identify the rows to be returned to the user, and only those rows of interest returned to the user. Returning only a subset of rows reduces the data that has to flow from the server to the client, reducing network and client resource usage. Releasing the table before returning control to the user may avoid state being held on the server between user requests.

To execute a database command that returns a stream of results, a connection to a database to be accessed may be created and opened. A database command may be created including a query to be executed, and an execution command called to return an enumerator over the stream of results.

An execute page reader method to execute a command and return a single page from within an arbitrary result may be added to the database command object. The added method may receive a starting row ordinal and a number of rows to read, and return an enumerator, or reader, over a stream of results including only those rows within the specified range.

When the execute page reader method is called, the database command object may generate a batch statement that declares and opens a dynamic, server-side cursor over the user's query, calls a fetch method specifying an offset comprising the start row and a batch size of the size of the page. The cursor may be closed and de-allocated. Although a server-cursor may be used to efficiently position and retrieve the requested rows from the result, the server-cursor may be closed and de-allocated by the time the reader is returned. The results for the page may be read in a forward-only, read-only fashion, so the usage pattern is still focused on retrieving the data as a stream and then working with the results in a disconnected fashion.

Using this method, when a request is received for a range of rows from within a potentially large result, a server cursor is opened, positioned to the starting row, the number of requested rows are retrieved and any resources associated with the cursor are released prior to returning any results to the client. Cursor declaration, open, position, fetch, close and de-allocation actions may be done in a batch or as individual operations. The requested rows may be retrieved either in a single block fetch, multiple block fetches or each row individually.

Alternatively, when the execute page reader method is called, the database command object may generate a command to select the query results into a temporary table, for example, using a SELECT INTO statement. The results selected into the temporary table may be a subset of the full query results, for example the TOP statement may be used to limit the results to the number of rows before the starting row in the range plus the number of rows in the range. Further processing is performed on the server to identify the rows to be returned to the user, for example the addition of row numbers to the temporary table against which a predicate may be applied to select the rows of interest, or server commands to read past the rows to be skipped and return only those rows of interest. Selection into the temporary table on the server provides a mechanism for processing the results and returning only those within the desired range.

When a request is received for a range of rows from within a potentially large result, a temporary table may be created, processing performed to position on the starting row, the number of requested rows retrieved, and any resources associated with the temporary table released prior to returning any results to the client. Temporary table population, positioning, return of rows, and removal may be done in a batch or as individual operations. The results for the page may be read in a forward-only, read-only fashion, so the usage pattern is still focused on retrieving the data as a stream and then working with the results in a disconnected fashion.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In today's world, a user may make a request that resolves to a potentially large set of matches (for example, the results of a search engine search on the Internet). Where the number of rows in the result exceed what can be shown on a single screen, users expect to be able to navigate, or "scroll", forward and backward through the results, displaying a screen full of data at a time. When the number of rows in the result is very large, having to wait until all the results are transmitted to the client machine may be very undesirable, both in terms of user delay as well as the use of database, network, and client memory and processing resources.

Server Cursors

Many databases offer the ability to scroll through a set of results through the use of "Server Cursors" (result set cursors maintained within the database). Server cursors provide a convenient model for traversing potentially large sets of results. Server cursors may support the ability to move, forward, backward, or to an arbitrary position within a result and fetch one or more rows from the current position, matching the types of operations a user may perform when scrolling through a set of results, for example, in a grid.

Types of scrollable server cursors include a static or snapshot cursor, a keyset cursor and a dynamic cursor. With a snapshot cursor, a temporary copy is made of the entire result. Cursor operations scroll over the temporary copy of the data. Because the copy is a snapshot of the data as it exists in a moment of time is captured, changes made to the database for data in the snapshot is not reflected in the copy made and therefore is not visible to a user of the data for the lifetime of that cursor.

A keyset cursor maintains a list of indexes to rows requested in a query. As a user scrolls through the data, he is actually scrolling through the index and when a value is requested for the row, the current value associated with the chosen index is retrieved from the database. Thus, if a change is made to a row in the database, the change will be visible to the user. If, however, a new record is added that would logically have been part of the set selected by the user, the new record will not be visible because the index of the new record is not within the list of indexes the user can view. Similarly if someone changes the values of an existing row in the result such that it no longer matches the criteria specified for the result, changes the values of an existing row outside of the result such that it now matches the criteria and logically belongs as part of the result, or changes a value on which the result is sorted, the set and order of rows visible to the user remains unchanged and does not reflect the corresponding expected removal from, addition to, or change in ordering of, the result.

A dynamic cursor requires a unique index across a set of results. As the user scrolls through the data, next or previous records are calculated dynamically, based on a combination of the original query and the value of the current row. Changes made to the database are visible to the user as are insertions and deletions made to the database.

Each of these types of scrollable server cursors require the database server to maintain state for each set of results between database requests, and may require the client to release that state when the results are no longer in use. These requirements may become problematic in a large enterprise or web environment where holding state between requests for each client is expensive, and the lifetime of that state may be indeterminate.

Building a scalable, distributed system such as is required for today's enterprise applications is advanced by minimizing state held in shared resources. In particular, databases often become the bottleneck in the scalability of a system since they represent the true, persistent state of information often shared by multiple resources. Accordingly, scalability is achieved by limiting applications to short interactions with the persisted data, and not holding user state in the database between interactions.

It will be apparent that the desire of users to interact richly with data is at odds with scalability. To improve scalability while still offering a rich user experience, enterprise applications are moving to more of a disconnected model, where transient state is kept on the client and the database contains only durable state. Interactions with the durable state are generally kept to simple retrieval or update operations, with no user state held on the database in between. The advantage of a disconnected programming model lies in the fact that the database is able to share connections across multiple different clients instead of holding many open connections and other user state at the same time. More state is maintained on the client, and interactions are generally well defined and short lived. In short, the concept of disconnected programming is key in building scalable applications.

Client Cursors

The three types of scrollable cursors may also be implemented on the client. To implement the static or snapshot cursor on the client, the entire set of rows requested from the database are copied to the client machine. For large results this has the affect of copying and holding a potentially large amount of data to the client that the user may never view, resulting in high latency, increased network traffic, increased database load, and excessive memory consumption on the client.

A keyset cursor may also be implemented on the client where keys are available for each row of the result by retrieving the set of keys and querying the database for the remaining row values based on the key each time the application requests a row. However, similar to the static or snapshot cursor, a keyset cursor over a large result must download keys for every row in the potentially large result. Additionally, each scrolling operation results in additional queries against the database for the corresponding row values. Finally, this mechanism doesn't work well for results that don't have unique keys for each row, such as joined, grouped or aggregated results, or results returned by a stored query or procedure.

To implement a dynamic cursor on the client, knowledge of the sort order and the keys of the database is required so that a user's query can be rewritten to find a value greater than or less than sorted key values of the current row. Again, in addition to the complications of rewriting the query on the client, such keys may not be available for certain types of results.

Paging

In cases where the results of a query are potentially large, enterprise applications generally employ a strategy known as paging wherein each client request retrieves a moderately sized subset (page) of the data. Pages are typically defined by the ordinals of the rows they contain. For example, a user can request to see the first ten results. Typically an option exists to get the next ten and the previous ten as well, if those results exist. When a user clicks "next", for example, the request is typically sent out again to the database requesting results 11-20, and so on.

The simplest way to do paging is to request all the results, and disregard those outside of the current page. Let's say the application retrieves ten rows for the first page, and disregards the rest of the results by closing the result. If the user subsequently requests the next page, the same query is sent, all the results are again received but the first ten results are ignored and results are displayed starting with the $11^{th}$ result. The database may well have performed a lot of additional needless work, wasting processing power and time.

Typically closing the results is implemented by calling a close method on the result object. A disadvantage of using this method is that some or all of the remaining results from the database may have to be read to clear off the wire (that is to clear off the pipe or connection). Some database systems are optimized so that once the database starts sending data, data continues to be written into the pipe until all of the results have been sent. For example, if a search engine search on the Internet has been done, and the user has looked at the first ten records, to clear the pipe, a million records may have to be read off the wire.

A cancel method for the command may exist that may be issued on a back channel to cancel the reading of data into the pipe, but some number of cached up results may still have to be read. Additionally, the database may have done other unnecessary processing to get to that point.

So, while there are ways to mitigate the handling of the first several pages, if a user asks for rows 1000 thru 1010, the first 1000 records are read and ignored, the application closes the result, and another buffer full of records has to be processed in order to process the stop command, a noticeable decrease in performance is likely to result.

To address the problem of limiting the number of results returned, a TOP clause may be specified in a query so that only the first n records are retrieved and the database stops. This addresses the problem of selection the first set of records. The TOP clause, however, is not useful if a user requests a set of records starting at row 5000. Additionally, TOP queries may not be supported in conjunction with results returned from stored queries or procedures.

Where queries are known in advance, paging can be implemented on the client through a parameterized query that accepts starting and/or ending values for an ordered key, or by dynamically generating a query in order to select the requested subset of data from the server. However, this generally requires knowledge of the query's sort order, key columns, and/or result row numbering support in the query processor in order to generate the proper queries. This information is difficult to obtain for an arbitrary query, which would in turn have to be parsed and rewritten to limit results to a single page of values. Since this parsing and rewriting occurs on the client, ensuring that semantics of the server query are maintained is particularly problematic.

In addition, client results are often obtained by executing stored queries or procedures defined within the database. The use of stored queries and procedures improves performance and enhances manageability of the database logic. However, since the stored queries or procedures are defined within the database, not on the client, they don't lend themselves to the type of client-side rewriting needed to support cursoring on the client.

For all of these reasons, efficient paging has long been a challenge, particularly where the queries are generated by the client in an ad-hoc fashion.

In accordance with the invention, a series of commands is provided to the server in order to identify and return a range of rows within a query result. Commands may be issued to create a temporary result on the server, position to the first row to be returned, return the requested range of rows, and then release the temporary result. These commands may be sent to the database in a single batch in order to avoid keeping state on the database server between requests.

In one embodiment of the invention, the query processor's cursoring capabilities are exploited not to hold state between request but rather to identify a range of rows to be returned by a single request. The cursor may be declared, opened, fetched from, closed and deallocated in a single batched request in order to avoid keeping state on the database server between requests. A single block fetch may be used within the batch to retrieve the requisite number of rows from the specified ordinal position. This approach is able to exploit intelligence built in to the query processor to support server cursors while avoiding maintaining state between client requests and without having to further parse or understand the query on the client.

In an alternate embodiment of the invention, database statements are used select a range of results from a temporary table created to hold the results of the query. The temporary table may be populated, the desired rows retrieved, and the temporary table released in a single batched request in order to avoid keeping state on the database server between client requests. This approach minimizes the data sent to the client while avoiding maintaining state between client requests without the need to parse or understand the query on the client.

In yet another embodiment of the invention, a simple forward only cursor may be substituted for the temporary table, and further processing may include database commands (for example, transact sql (TSQL) statements) to read past the rows to be skipped and return only those rows of interest.

Exemplary Computing Environment

Figure 1:
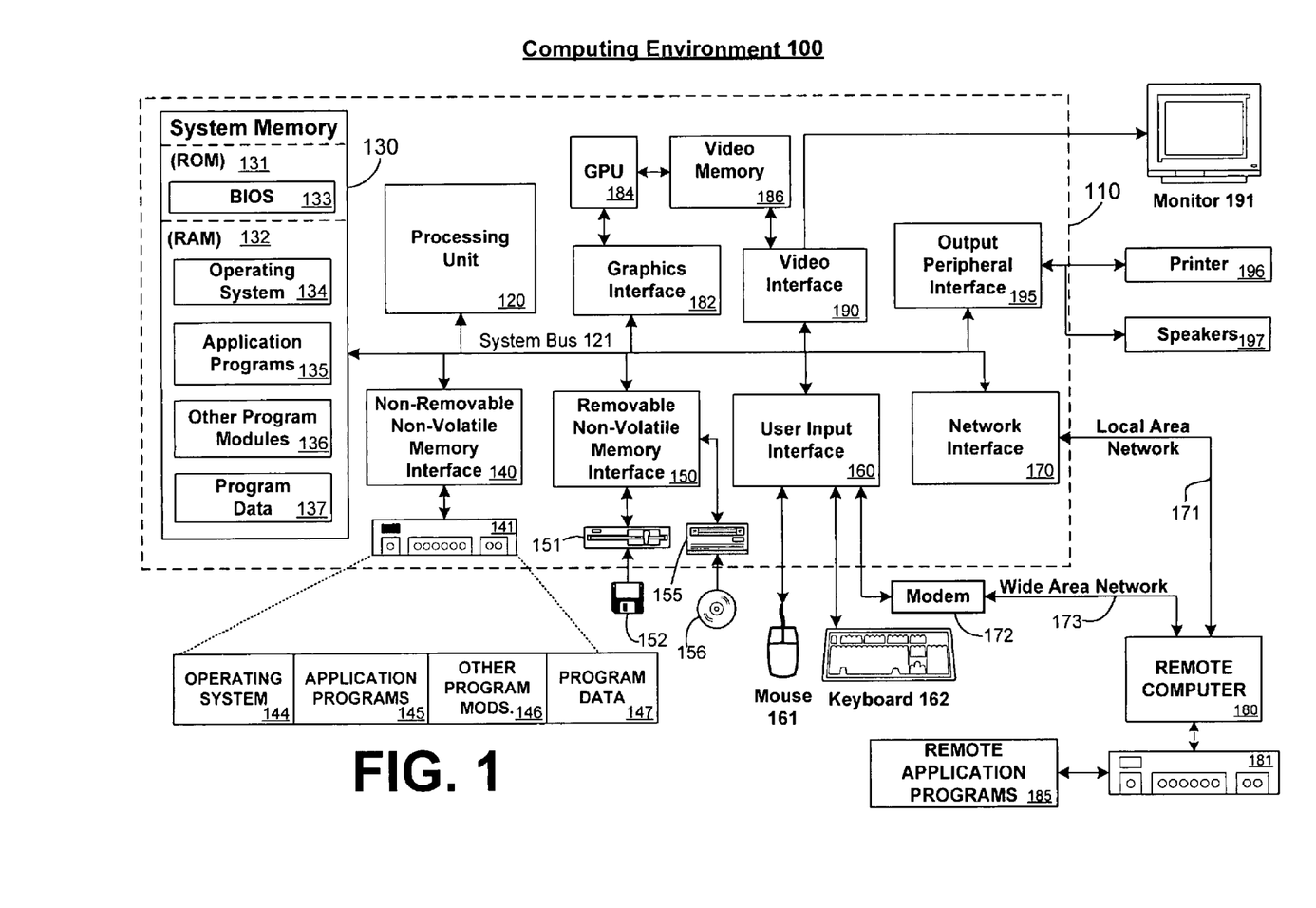
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Use of Server Processing for Stateless Paging over Arbitrary User Queries

Figure 2:
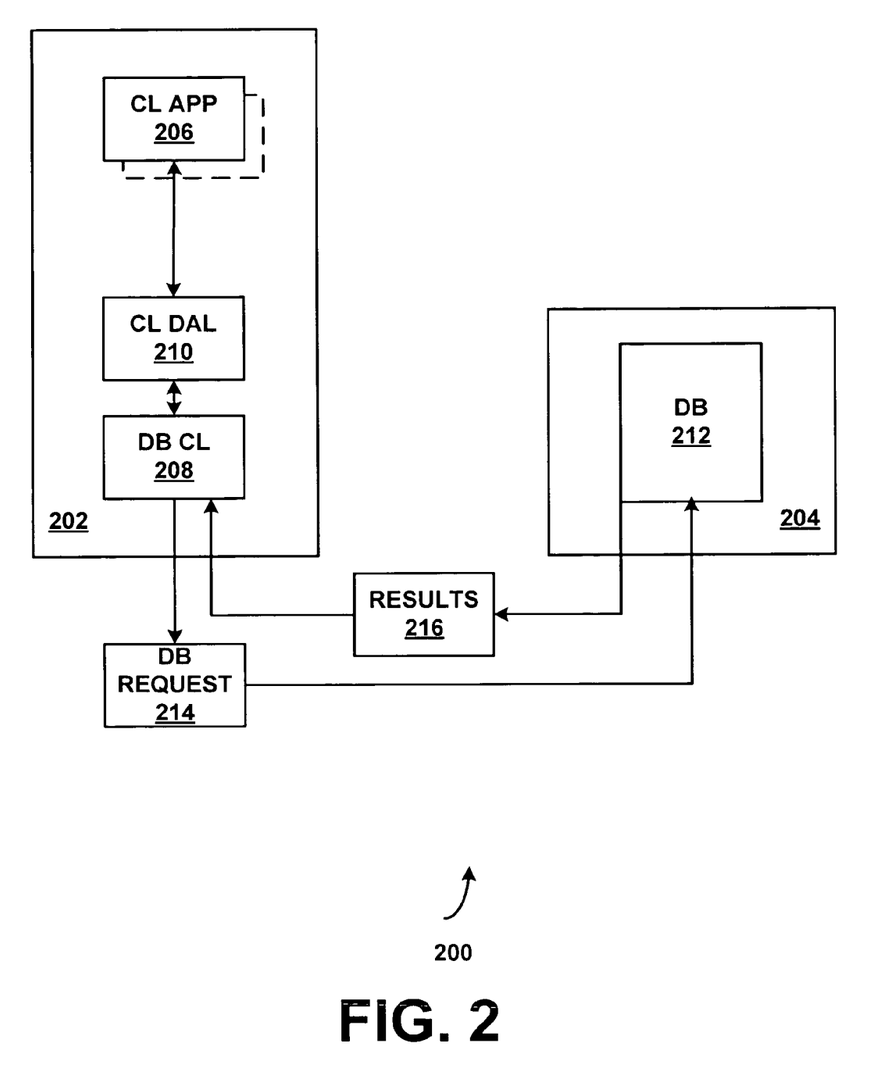
FIG. 2 is a block diagram of a system for using server processing for stateless paging over arbitrary user queries in accordance with one embodiment of the invention.

FIG. 2 illustrates an exemplary system for using server processing for stateless paging over arbitrary user queries in accordance with some embodiments of the invention. In FIG. 2, system 200 may comprise a client 202 and a server 204. Typically client 202 and server 204 reside on separate computers; such as computer 110 and remote computer 180 described with respect to FIG. 1, however, client and server software may in fact reside on the same machine. Client 202 may host one or more client applications 206, etc. and client-side database accessing code 208. In some embodiments of the invention, database accessing code 208 may comprise a vendor-specific client interface such as Oracle's Call-level Interface (OCI), a common interface such as ODBC or OLE DB, a Java or .NET Framework provider such as SqlClient, and so on. Typically database accessing code 208 resides on the client and communicates directly with database 212, but database accessing code 208 could have a corresponding component on server 204 that communicates with the database 212.

Client side processing through a common data access layer 210 encapsulates common functionality against database accessing code 208. Data access layer 210 may be part of database accessing code 208 or may be a separate component that abstracts possibly multiple calls to database accessing code 208 in response to a single method invocation from application 206. Application 206 running on client 202 may communicate with data access layer 210. For example, application 206 may request data access layer 210 to connect to database 212. In response, data access layer 210 may request database accessing code 208 to open a connection to database 212. Application 206 may provide a string to data access layer 210. The string may comprise a query to be made against database 212. An exemplary string may be:

SELECT*FROM customers.

Alternatively, the client application 206 may provide input to data access layer 210 from which data access layer 210 generates a database request 214.

The client-side database accessing code 208 may send the request 214 to the corresponding server-side database 212. The request may be interpreted, optimized and executed and the results 216 may be packaged up and sent back to the client 202.

If results are viewed through a static or, where possible, keyset or dynamic server cursors, state may be maintained by the database for each result with uncertain lifetime semantics. Alternatively, if the results are viewed via implementation of a static or snapshot cursor on the client, the results sent from the database 212 are typically a copy of all of the rows selected by the query. If on the client, the results are viewed via implementation of a keyset server cursor, the key for each row are typically retrieved with additional server requests each time values for a particular row are requested. Implementing a keyset or dynamic cursor on the client requires additional information and query rewriting that does not lend itself to many types of ad-hoc or stored queries or procedures.

Hence, the problem of only bringing across the rows requested without holding unnecessary state on the database between requests remains. To address this problem, in accordance with some embodiments of the invention, the data access layer may create a temporary result within the database, such as a scrollable cursor or temporary table. The data access layer may position to a particular place within a set of results, and fetch a certain number of rows from that position. That is, in response to receiving a request for a range of records, the data access layer may request the database to create a scrollable cursor or temporary table for the fields of the database specified, position at a particular row and return the next specified number of rows. This is in contrast to a user interacting with the database and holding state between different requests.

This technique has the advantage that it is not necessary to parse the query at the client, instead the query is passed to the database with the following instructions: create a temporary result within the database, position to the position specified, return the specified number of rows and release the temporary result. Hence, the database avoids maintaining state on the client between requests.

Figure 3:
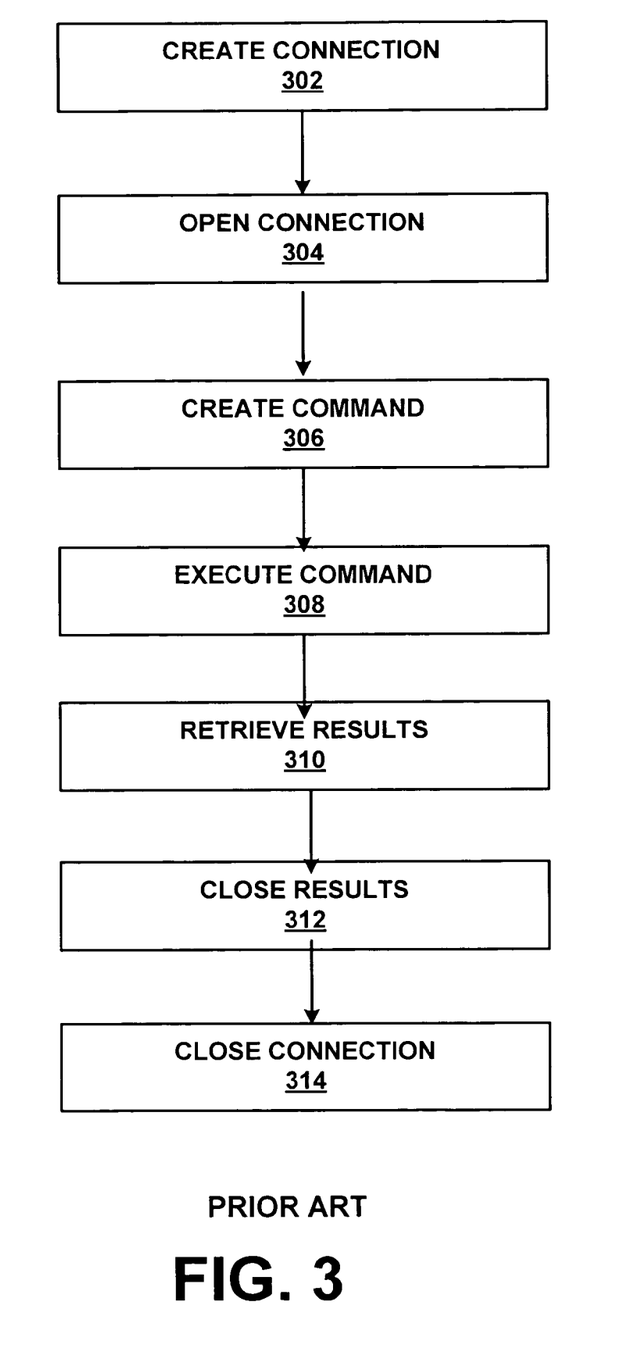
FIG. 3 is a flow diagram of a method for interacting between client and server as is known in the art.

FIG. 3 is a flow diagram of a method for a typical interaction between client and server as is known in the art. At step 302 a connection between client and server is created. At step 304 the connection is opened. At step 306 a command is created. At step 308 the command is executed, including any parameter values from the client. At step 310 the results are retrieved. At step 312 the results are closed and at step 314 the connection is closed.

Figure 4:
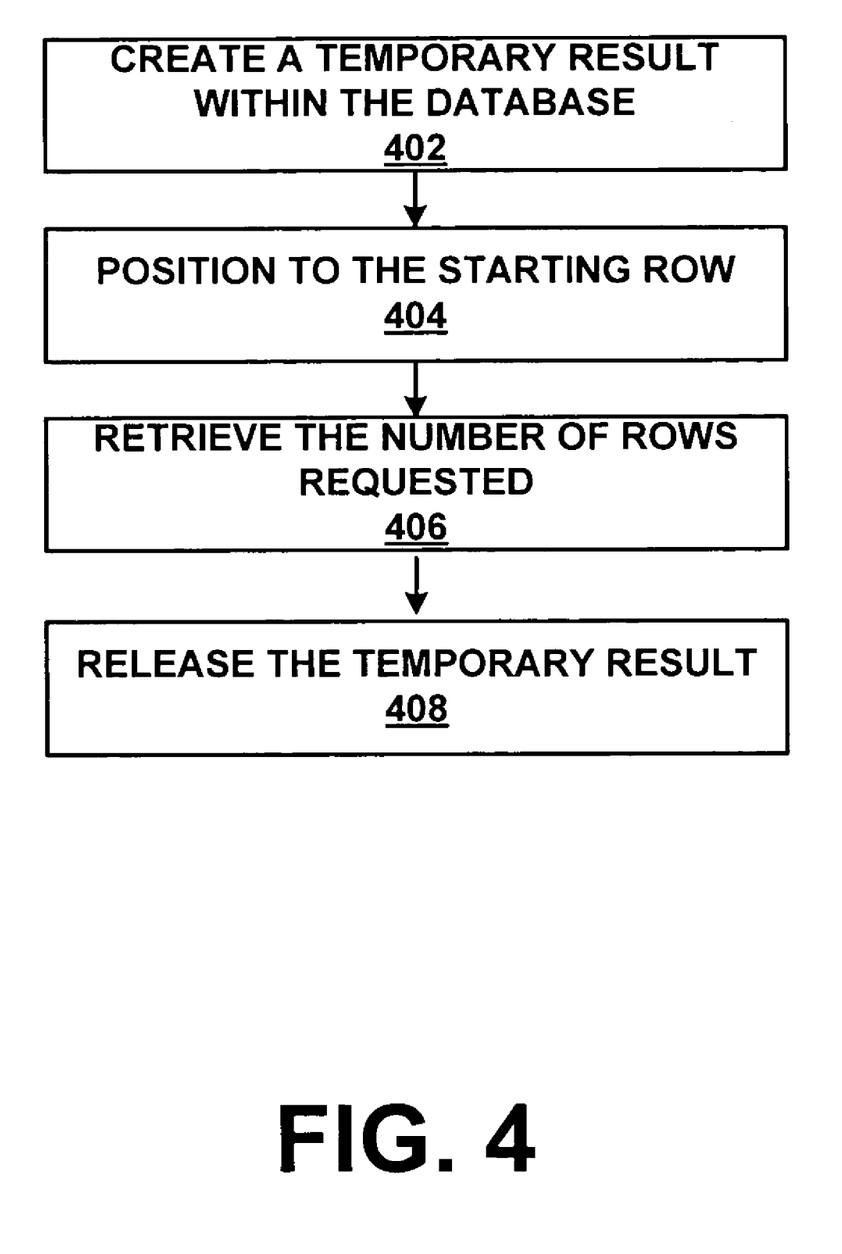
FIG. 4 is a flow diagram of a method for using server processing for stateless paging over arbitrary user queries in accordance with one embodiment of the invention.

FIG. 4 is a flow diagram of an implementation of step 308, describing an exemplary method for using server processing for stateless paging over arbitrary user queries in accordance with some embodiments of the invention. At step 402 a temporary result is created within the database, using the command text and parameters from the application. The temporary result may be a forward only stream over the application's query, a scrollable server cursor, or a regular or temporary table, for example. The temporary results may be limited, for example through the use of a TOP query specifying the number of rows before the starting row in the range plus the number of rows in the range. At step 404, the data access layer positions to the starting row within the temporary result. At step 406, the data access layer retrieves the requested number of rows from the temporary result. At step 408 the data access layer releases the temporary result.

Processing temporary results on the database server to return only a subset of rows reduces the data that has to flow from the server to the client, reducing network and client resource usage. Releasing the temporary results before returning control to the user avoids state being held on the server between user requests. The creation of the temporary results, additional server processing of results to identify and return rows within a specified range, and disposal of the temporary results may be done as individual statements, or some or all of the steps may be combined as in a batch. In any case, the use of the temporary results allows a subset of the results to be programmatically determined without parsing or obtaining additional knowledge regarding the original query.

In some embodiments of the invention, a single call is made (e.g., in some embodiments of the invention, execute page reader is the name of the call). Hence state is not held, only the requested rows have been read over the wire, state has been released, the database has been given the opportunity to optimize that batch of statements and how it positions and retrieves that set of rows.

Figure 5:
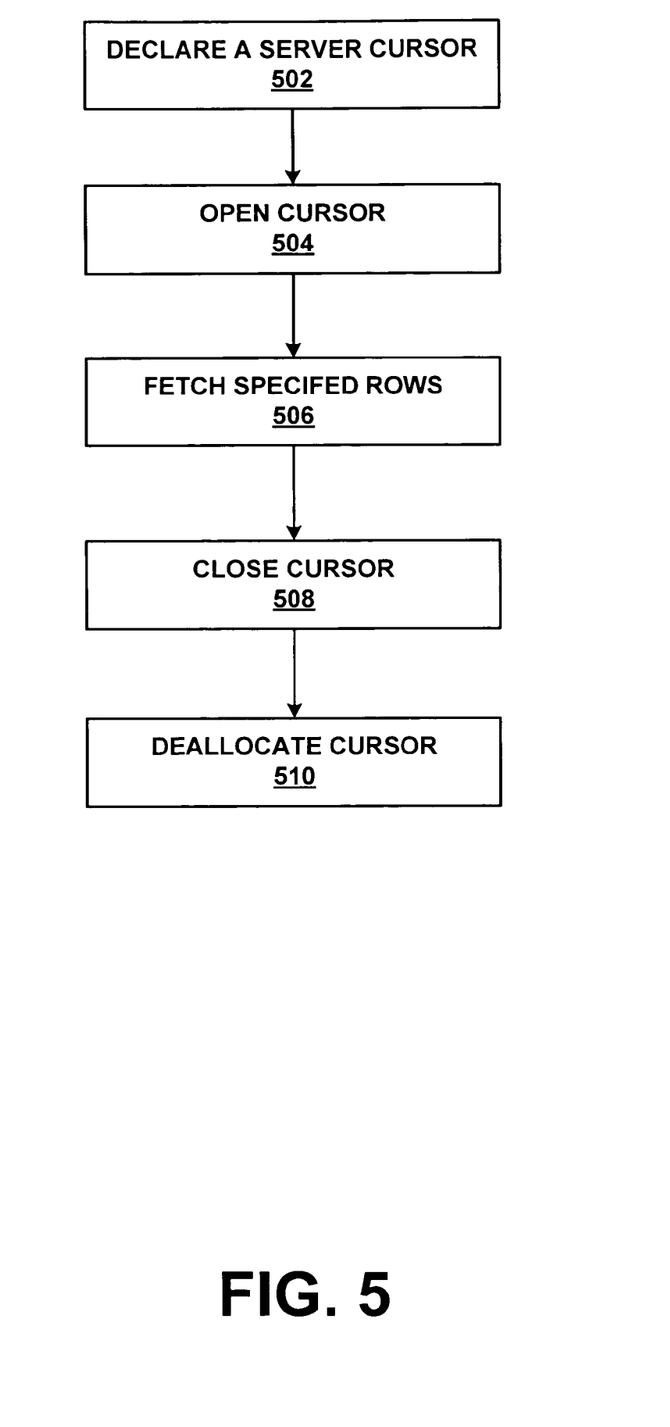
FIG. 5 is a more detailed flow diagram showing the use of server cursors to facilitate the server processing defined in FIG. 4.

FIG. 5 is a more detailed flow diagram of the method of FIG. 4 showing the use of server cursors to return a range of rows from a user query in accordance with some embodiments of the invention. At step 502, a server cursor is declared using the command text and parameters from the application. At step 504 the server cursor is opened. At step 506 a request to fetch rows starting at the specified row and having a block size of the number of rows requested is executed. At step 508 the cursor may be closed and at step 510 the cursor may be de-allocated.

In some embodiments of the invention, the commands may be batched together and sent to the server in a single datastream. To request a server cursor, rather than calling an execution command to execute the database query, a set of commands may be called. These commands can be batched together and may include:

instead of executing the query statement, declare a cursor, using a supplied query string and parameters     open the cursor     fetch from that cursor starting at position x for y number of rows     close the cursor     de-allocate the cursor.

In some embodiments of the invention, the client-side database software batches the above commands into a single statement, separated for example by semicolons, and sends the statement to the database. The database may parse the statement, optimize it, process it, declare the cursor, open the cursor, position to the specified row number, get the indicated rows, send the indicated rows back to the client, close and de-allocate the cursor. In some embodiments of the invention, all these steps are accomplished in one round trip. Batching the steps into a single request may result in greater efficiency and minimize the length of time the connection is held open and the state on the database is maintained.

Figure 6:
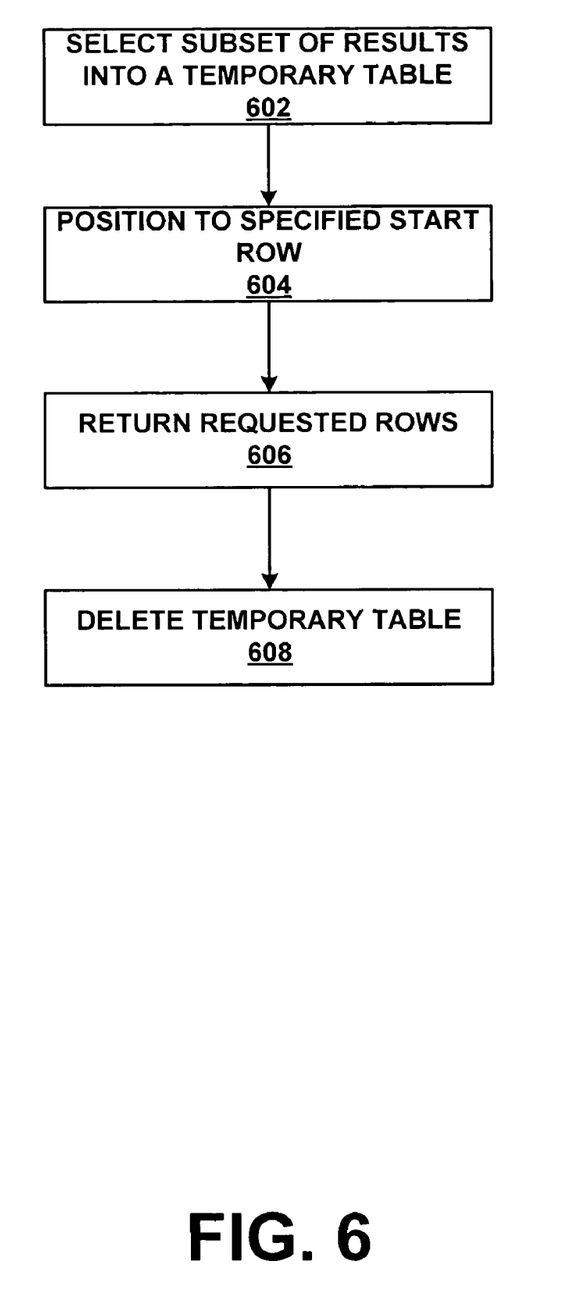
FIG. 6 is a more detailed flow diagram showing the use of a temporary table to facilitate the server processing defined in FIG. 4.

FIG. 6 is a more detailed flow diagram of the method of FIG. 4 showing the use of a temporary table to return a range of rows from a user query in accordance with an alternate embodiment of the invention. At step 602 a temporary table is created and populated with a subset of the results of the users query, for example through the use of a SELECT INTO statement. The temporary table may be a special type of table that is automatically closed and de-allocated when the connection is closed or reset, or may be a regular table may that is closed and de-allocated explicitly. The results selected into the temporary table may be limited, for example through the use of a TOP query specifying the number of rows before the starting row in the range plus the number of rows in the range. At step 604 the data access layer positions to the first requested row in the result. At step 606 the data access layer returns the requested rows. At step 608 the temporary table is deleted.

In some embodiments of the invention, the commands may be batched together and sent to the server in a single datastream. To perform additional server processing to limit the rows returned, rather than calling an execution command to execute the database query, a set of commands may be called. These commands can be batched together and may include:

instead of executing the query statement, select a subset of the results into a temporary table using a supplied query string and parameters     position to the starting row in the temporary table     fetch the requested number of rows from the temporary table     delete the temporary table In some embodiments of the invention, the client-side database software batches the above commands into a single statement, separated for example by semicolons, and sends the statement to the database. The database may parse the statement, optimize it, process it, create and populate a temporary table to hold a subset of the results, position to the specified row number, get the indicated rows, send the indicated rows back to the client, and drop the table. In some embodiments of the invention, all these steps are accomplished in one round trip. Batching the steps into a single request may result in greater efficiency and minimize the length of time the connection is held open and the state on the database is maintained.

Figure 7:
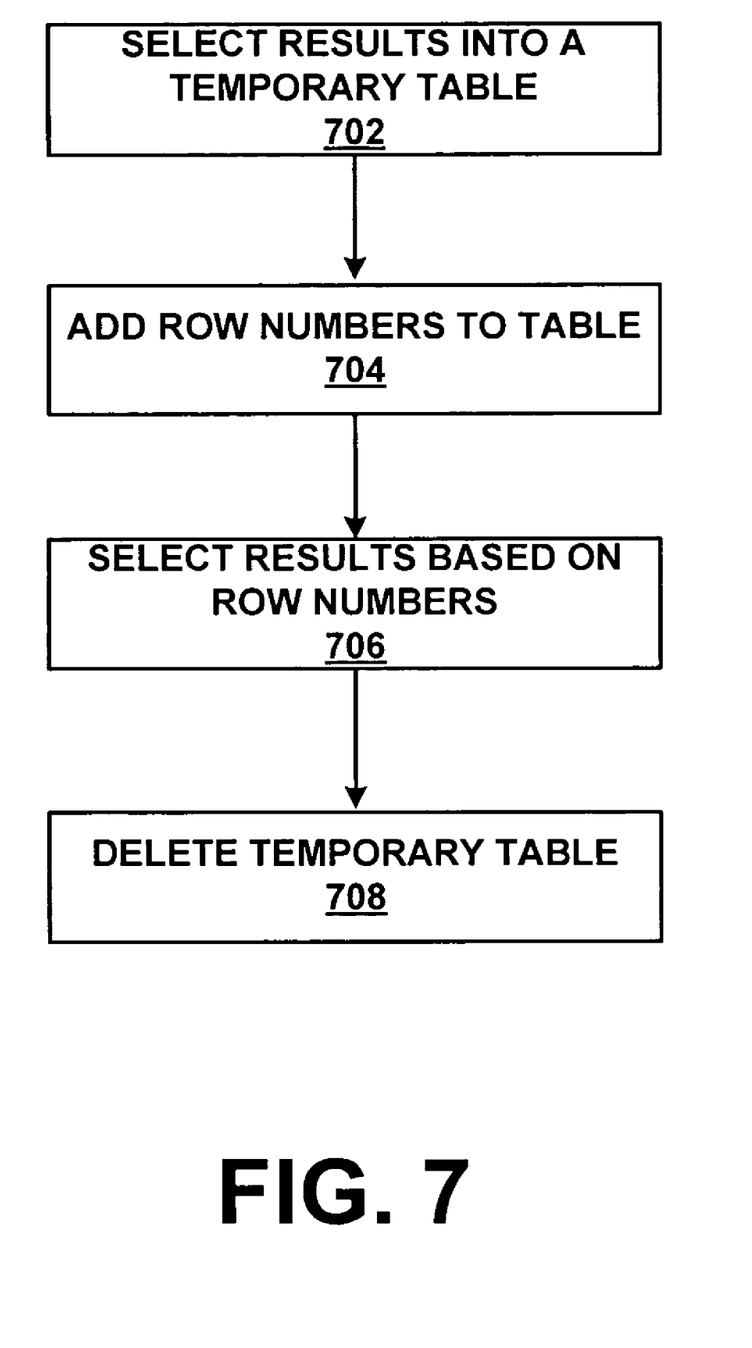
FIG. 7 is a more detailed flow diagram showing the use of row numbers in conjunction with a temporary table to facilitate the server processing defined in FIG. 4.

FIG. 7 is a more detailed flow diagram of the method of FIG. 4 showing the use of row numbers in conjunction with a temporary table to facilitate determination of the rows to be returned. At step 702 a temporary table is created and populated with a subset of the results of the users query, for example through the use of a SELECT INTO statement. The temporary table may be a special type of table that is automatically closed and de-allocated when the connection is closed or reset, or may be a regular table may that is closed and de-allocated explicitly. The results selected into the temporary table may be limited, for example through the use of a TOP query specifying the starting row plus the number of rows to retrieve. In step 704 row numbers are added to the temporary table to facilitate selecting the range of rows requested, for example through the use of a ROW_NUMBER statement or by adding an automatically incrementing integer field, such as an IDENTITY column. The addition of row numbers step 704 may be done as part of creating the temporary table 702 or in a separate step following creation of the temporary table. At step 706 the requested range of rows are retrieved from the table using a predicate based on the row numbers, for example a BETWEEN clause specifying the start row and start row plus number of rows to retrieve. At step 708 the temporary table is deleted.

In some embodiments of the invention, the commands may be batched together and sent to the server in a single datastream. To perform additional server processing to limit the rows returned, rather than calling an execution command to execute the database query, a set of commands may be called. These commands can be batched together and may include:

instead of executing the query statement, select a subset of the results into a temporary using a supplied query string and parameters     add row numbers to the temporary table     select the range of rows to be returned to the client using the added row numbers     delete the temporary table In some embodiments of the invention, the client-side database software batches the above commands into a single statement, separated for example by semicolons, and sends the statement to the database. The database may parse the statement, optimize it, process it, create and populate a temporary table to hold a subset of the results, add row numbers, select a range of rows to return to the client using the row numbers, and drop the table. In some embodiments of the invention, all these steps are accomplished in one round trip. Batching the steps into a single request may result in greater efficiency and minimize the length of time the connection is held open and the state on the database is maintained.

In some embodiments of the invention, database client code may be written to a specific database about which additional information is known. Such information may include how the database creates, executes and retrieves the data from that server cursor in the database.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A client computer system for use in communicating over a network with a second computer system on which a database server is executing the client computer system comprising:

a processing unit;

an application executing on the processing unit that issues a database query to request a set of results from the database server via the network;

a data access layer executing on the processing unit that receives the database query from the application and transforms the database query into a first series of commands that, when executed by the database server, cause the database server to (a) declare a first server cursor within the database using parameters of the database query received from the application, (b) retrieve a specified number of rows by commanding the database server to open the first server cursor and fetch the specified number of rows from a starting position of the first server cursor, (c) close the first server cursor, and (d) de-allocate the first server cursor, wherein commanding the database server to de-allocate the first server cursor avoids state associated with the database query received from the application from being held on the server until a subsequent request by the client computer system for additional results responsive to the database query;

the data access layer transmitting the commands of the first series of commands to the database server via the network, receiving the rows specified by the first server cursor from the database server, and returning the rows specified by the first server cursor to the application in response to the query, upon a request for additional results responsive to the database query, the data access layer generating a second series of commands that, when executed by the database server, cause the database server to (a) declare a second server cursor within the database using parameters of the database query received from the application, (b) retrieve a specified number of rows by commanding the database server to open the second server cursor and fetch the specified number of rows from a starting position of the second server cursor, (c) close the second server cursor, and (d) de-allocate the second server cursor;

the data access layer transmitting the commands of the second series of commands to the database server via the network, receiving the rows specified by the second server cursor from the database server, and returning the rows specified by the second server cursor to the application in further response to the query, and wherein each of the first and second series of commands is grouped together in a single call and is transmitted to the database server together as part of that single call.

2. The client computer system of claim 1, wherein each server cursor comprises a scrollable cursor.

3. The client computer system of claim 1, wherein each series of commands includes a TOP clause to limit the temporary set of results.

4. The client computer system of claim 1, wherein the single call comprises a single batched request transmitted to the database server via the network.

5. The client computer system of claim 1, wherein execution of each series of commands results in receiving a page of data selected from the database and not receiving on the client computer system, any results not selected.

6. The client computer system of claim 1, wherein the single call comprises a single method call on the client computer system that is then issued to the database server via the network.

7. A method for performing pseudo-stateless paging on a client computer system that communicates over a network with a second computer system on which a database server is executing, the method comprising the following steps performed on the client computer system:

receiving a database query from an application executing on the client computer system and transforming the database query into a first series of commands that, when executed by the database server, cause the database server to (a) declare a first server cursor within the database using parameters of the database query received from the application, (b) retrieve a specified number of rows by commanding the database server to open the first server cursor and fetch the specified number of rows from a starting position of the first server cursor, (c) close the first server cursor, and (d) de-allocate the first server cursor, wherein commanding the database server to de-allocate the first server cursor avoids state associated with the database query received from the application from being held on the server until a subsequent request by the client computer system for additional results responsive to the database query;

transmitting the commands of the first series of commands to the database server via the network;

receiving the rows specified by the first server cursor from the database server;

returning the rows specified by the first server cursor to the application in response to the query;

upon a request for additional results responsive to the database query, generating a second series of commands that, when executed by the database server, cause the database server to (a) declare a second server cursor within the database using parameters of the database query received from the application, (b) retrieve a specified number of rows by commanding the database server to open the second server cursor and fetch the specified number of rows from a starting position of the second server cursor, (c) close the second server cursor, and (d) de-allocate the second server cursor;

transmitting the commands of the second series of commands to the database server via the network;

receiving the rows specified by the second server cursor from the database server; and returning the rows specified by the second server cursor to the application in further response to the query, and wherein each of the first and second series of commands is grouped together in a single call and is transmitted to the database server together as part of that single call.

8. The method recited in claim 7, wherein each server cursor comprises a scrollable cursor.

9. The method recited in claim 7, wherein each series of commands includes a TOP clause to limit the temporary set of results.

10. The method recited in claim 7, the single call comprises a single batched request transmitted to the database server via the network.

11. The method recited in claim 7, wherein execution of each series of commands results in receiving a page of data selected from the database and not receiving on a client machine, any results not selected.

12. The method recited in claim 7, wherein the single call comprises a single method call on the client computer system that is then issued to the database server via the network.

13. The client computer system of claim 1, wherein each server cursor comprises a forward only cursor.

14. The client computer system of claim 2, wherein each scrollable cursor comprises a static cursor.

15. The client computer system of claim 2, wherein each scrollable cursor comprises a keyset cursor.

16. The client computer system of claim 2, wherein each scrollable cursor comprises a dynamic cursor.

17. The method recited in claim 7, wherein each server cursor comprises a forward only cursor.

18. The method recited in claim 8, wherein each scrollable cursor comprises a static cursor.

19. The method recited in claim 8, wherein each scrollable cursor comprises a keyset cursor.

20. The method recited in claim 8, wherein each scrollable cursor comprises a dynamic cursor.

* * * * *